Patented Oct. 22, 1940

2,218,795

UNITED STATES PATENT OFFICE 2,218,795

METHOD OF MAKING ABRASIVE ARTICLES

Samuel S. Kistler, West Boylston, and Carl E. Barnes, Worcester, Mass., assignors to Norton Company, Worcester, Mass., a corporation of Massachusetts No Drawing. Application January 28, 1938, Serial No. 187,549

6 Claims. (Cl. 51—298)

The invention relates to the manufacture of abrasive articles, for example grinding wheels, and with regard to its more specific features, to the manufacture of resin bonded abrasive articles.

One object of the invention is to provide a facile method for the manufacture of abrasive articles. Another object of the invention is to provide a method for the manufacture of abrasive articles bonded with resinous bond whereby an extremely dense product may be obtained. Another object of the invention is to provide a method for the manufacture of abrasive bodies whereby polymerization in situ is achieved. Another object of the invention is to provide a simple method for the manufacture of abrasive articles from the raw products. Other objects will be in part obvious or in part pointed out hereinafter.

The invention accordingly consists in the combinations of elements and in the several steps and relation and order of each of said steps to one or more of the others thereof, all as will be illustratively described herein, and the scope of the application of which will be indicated in the following claims.

We provide a circular mold substantially the size of a grinding wheel. Preferably this mold has the form of a dish, i. e. it has a cylindrical side wall and an integral bottom. The bottom has a plane surface and the cylindrical wall is modified by a slight taper, that is to say it is really a hollow frustum of a cone. In the center of the mold is a plug. The plug is nearly cylindrical but is also actually slightly conical, viz. constitutes a frustum of a cone. The tapers of the plug and of the cylindrical wall are very slight, for example of the order of one degree. The tapers of the side wall and of the plug are such that the final article may readily be removed. We further provide a flat cover plate for the mold.

We provide a quantity of abrasive grain. Any abrasive grain may be used and in any grit sizes desired. For example, it has been customary to make abrasive articles including grinding wheels from abrasive grain of grit sizes anywhere from eight mesh to four hundred mesh inclusive, the number indicating the number of meshes per linear inch to a screen with square openings through which the abrasive grain will pass. Suitable abrasives are alumina in its various forms, including electric furnace fused alumina, corundum and emery, also silicon carbide and the other hard carbides as tungsten, tantalum and boron carbide, diamonds, garnet and quartz.

Example I

Taking sixteen hundred and fifty-six grams of abrasive grain, we place it in a mold big enough to hold the grain with one-third of the space of the mold unfilled above the grain. We then pour onto the grain the following mixture: three hundred and ninety cubic centimeters of methyl methacrylate and one hundred cubic centimeters of ethylene glycol dimethacrylate, and ten cubic centimeters of methyl methacrylate containing one per cent of benzoyl peroxide as a catalyst. The liquid quickly penetrates into the mass of abrasive grain and wets all the individual grains thereof, but having a specific gravity less than the grains there will be clear liquid above them.

We then place the mold in an oven and heat to 60° C. for a period of about twenty-four hours. We then give the wheel a final baking at 100° C. for a period of five hours. We then remove the wheel from the mold and true off the clear resin on one side which has no abrasive grain and true it wherever else it needs truing and bush it, if necessary. The wheel is then complete.

This is a wheel of nearly zero porosity and gives excellent results in certain grinding operations. It has properties similar to that of rubber and shellac bonded grinding wheels but for certain purposes is superior to either. It has a softening point substantially above 100° C.

The proportion of ethylene glycol dimethacrylate may be varied widely, for example between five and thirty per cent. The more ethylene glycol dimethacrylate is used, the harder is the wheel.

Example II

Proceeding as in the above example, we substitute glycerol trimethacrylate for ethylene glycol dimethacrylate. The wheel produced resembles that made in Example I very closely.

Example III

Proceeding as in the given example, we substitute pentaglycerol trimethacrylate for ethylene glycol dimethacrylate. The wheel produced is very heat resistant.

Example IV

Using the same type of mold, we place in it sixteen hundred and fifty-six grams of suitable abrasive and pour on top of it a mixture of three hundred and sixty-five cubic centimeters of monomeric methyl methacrylate, one hundred and twenty-five cubic centimeters of monomeric methacrylic acid, and ten cubic centimeters of methyl methacrylate containing one per cent benzoyl peroxide catalyst. We then proceed as in Example I. The wheel produced resembles rubber bonded wheels in its resilience but is more heat resistant.

Example V

Using the mold already described and placing sixteen hundred and fifty-six grams of abrasive in it, we pour onto the abrasive the following mixture: three hundred and thirty cubic centimeters of methyl methacrylate, one hundred cubic centimeters of methacrylic acid, fifty cubic centimeters of ethylene glycol dimethacrylate, twenty cubic centimeters of methyl methacrylate containing one per cent benzoyl peroxide catalyst. We then proceed as in Example I. This wheel has properties intermediate between the wheels of Examples I to IV.

*Example VI*

Proceeding as already indicated, we place in the mold sixteen hundred and fifty-six grams of abrasive and pour onto it a mixture of the following: three hundred and sixty-five cubic centimeters of monomeric methyl methacrylate, one hundred and twenty-five cubic centimeters of monomeric allyl methacrylate, and ten cubic centimeters of methyl methacrylate containing one per cent benzoyl peroxide catalyst. We then proceed as in Example I. The wheel so produced is highly heat resistant but more resilient than that of Example I.

*Example VII*

Placing in the aforesaid mold sixteen hundred and fifty-six grams of abrasive, we add the following liquid mixture: three hundred and thirty cubic centimeters of methyl methacrylate, one hundred cubic centimeters of allyl methacrylate, fifty cubic centimeters of ethylene glycol dimethacrylate, and twenty cubic centimeters of methyl methacrylate containing one per cent benzoyl peroxide catalyst. This wheel is heat resistant and has superior grinding performance.

All the wheels herein described have the same general characteristics although they differ somewhat specifically. The resins soften at a temperature substantially above 100° C.

In the examples given, we have used only the esters of methacrylic acid. It is to be understood, however, that the esters of the other alpha substituted acrylic acids, such as alpha ethyl acrylic or alpha chloro acrylic acids may be used within the scope of this invention. Also, whereas the methyl ester of methacrylic acid is most commonly referred to, other monohydric alcohol esters, such as isopropyl, isobutyl or phenyl esters could equally well have been used. The above defined compounds may be referred to as unsaturated methylene compounds because each of them contains the $CH_2=$ group.

The present application covers the method of manufacturing wheels, and the resins herein disclosed and the abrasive bodies incorporating them are described and claimed in our various copending applications Serials Nos. 187,546, 187,547, 187,548, 187,550, 187,551, and 187,552, all filed on January 28, 1938.

It will thus be seen that there has been provided by this invention a method in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

We claim:

1. The method of making an abrasive body which consists in placing in an open mold the size of the finished article just enough loose uncoated abrasive grain to form the article, then pouring a polymerizable compound which is fluid at room temperatures onto the abrasive grain in the mold, then heating and without pressure thereby polymerizing the compound around the abrasive grains to a hard condition to form the final abrasive body in the mold, then stripping the abrasive body from the mold.

2. The method of making an abrasive body which consists in placing in an open mold the size of the finished article just enough loose uncoated abrasive grain to form the article, then pouring a polymerizable unsaturated methylene compound which is fluid at room temperatures onto the abrasive grain in the mold, then heating and without pressure thereby polymerizing the compound around the abrasive grains to a hard condition to form the final abrasive body in the mold, then stripping the abrasive body from the mold.

3. The method of making a grinding wheel which consists in placing in an annular cylindrical open mold the size of the finished article just enough loose uncoated abrasive grain to form the article, then pouring a polymerizable compound which is fluid at room temperatures onto the abrasive grain in the mold, then heating and without pressure thereby polymerizing the compound around the abrasive grains to a hard condition to form the final abrasive body in the mold, then stripping the abrasive body from the mold.

4. The method of making a grinding wheel which consists in placing in an annular cylindrical open mold the size of the finished article just enough loose uncoated abrasive grain to form the article, then pouring a polymerizable unsaturated methylene compound which is fluid at room temperatures onto the abrasive grain in the mold, then heating and without pressure thereby polymerizing the compound around the abrasive grains to a hard condition to form the final abrasive body in the mold, then stripping the abrasive body from the mold.

5. The method of making an abrasive body which consists in placing in an open mold the size of the finished article just enough loose uncoated abrasive grain to form the article, then adding a polymerizable unsaturated methylene compound which is fluid at room temperatures to the abrasive grain in the mold, then heating and without pressure thereby polymerizing the compound around the abrasive grains to a hard condition to form the final abrasive body in the mold, then stripping the abrasive body from the mold.

6. The method of making a grinding wheel which consists in placing in an annular cylindrical open mold the size of the finished article just enough loose uncoated abrasive grain to form the article, then adding a polymerizable unsaturated methylene compound which is fluid at room temperatures to the abrasive grain in the mold, then heating and without pressure thereby polymerizing the compound around the abrasive grains to a hard condition to form the final abrasive body in the mold, then stripping the abrasive body from the mold.

SAMUEL S. KISTLER.
CARL E. BARNES.